(12) United States Patent
Tomizawa

(10) Patent No.: US 11,009,706 B2
(45) Date of Patent: May 18, 2021

(54) HEAD-MOUNTED DISPLAY APPARATUS AND METHOD FOR CONTROLLING HEAD-MOUNTED DISPLAY APPARATUS FOR DETERMINING POSITION OF IMAGE TO BE DISPLAYED

(71) Applicant: SEIKO EPSON CORPORATION, Tokyo (JP)

(72) Inventor: Takashi Tomizawa, Chiisagata-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 7 days.

(21) Appl. No.: 16/255,122

(22) Filed: Jan. 23, 2019

(65) Prior Publication Data

US 2019/0227325 A1 Jul. 25, 2019

(30) Foreign Application Priority Data

Jan. 24, 2018 (JP) .............................. JP2018-009518

(51) Int. Cl.
*G09G 5/00* (2006.01)
*G02B 27/01* (2006.01)
*G06T 19/00* (2011.01)

(52) U.S. Cl.
CPC ....... *G02B 27/0172* (2013.01); *G02B 27/017* (2013.01); *G06T 19/006* (2013.01); *G02B 2027/014* (2013.01); *G02B 2027/0123* (2013.01); *G02B 2027/0138* (2013.01); *G02B 2027/0141* (2013.01); *G02B 2027/0178* (2013.01); *G02B 2027/0187* (2013.01)

(58) Field of Classification Search
CPC ...... G02B 2027/014; G02B 2027/0178; G02B 27/0141; G02B 27/0172; G02B 2027/0138; G06T 19/006
See application file for complete search history.

(56) References Cited

U.S. PATENT DOCUMENTS

| 8,001,466 B2 | 8/2011 | Kobayashi | |
|---|---|---|---|
| 2010/0123908 A1* | 5/2010 | Denoue | H04N 1/32128 358/1.6 |
| 2012/0147042 A1* | 6/2012 | Shinomoto | G02B 27/017 345/633 |
| 2012/0327117 A1* | 12/2012 | Weller | G06T 19/006 345/633 |

(Continued)

FOREIGN PATENT DOCUMENTS

| JP | 2006-350867 A | 12/2006 |
|---|---|---|
| JP | 2014-056217 A | 3/2014 |
| JP | 2015-146122 A | 8/2015 |

*Primary Examiner* — Weiming He
(74) *Attorney, Agent, or Firm* — Oliff PLC

(57) ABSTRACT

Included are an image display unit to be worn on a user U's head and configured to display an image overlapped on outside scenery visually recognizable through the image, a camera, a detection controller configured to detect, under a condition that imaging data of the camera includes an image of a sheet, a marker as an identifiable feature of the sheet from the imaging data, and a display controller configured to determine, based on the marker detected by the detection controller, a position for the image to be displayed, and to display the image at the position being determined.

9 Claims, 9 Drawing Sheets

(56) References Cited

U.S. PATENT DOCUMENTS

| | | | |
|---|---|---|---|
| 2014/0210856 A1* | 7/2014 | Finn | G01C 15/002 345/633 |
| 2015/0348328 A1* | 12/2015 | Tsuda | G02B 27/0172 345/633 |
| 2017/0295410 A1* | 10/2017 | Bloch | H04N 21/4316 |

* cited by examiner

HEAD-MOUNTED DISPLAY APPARATUS AND METHOD FOR CONTROLLING HEAD-MOUNTED DISPLAY APPARATUS FOR DETERMINING POSITION OF IMAGE TO BE DISPLAYED

BACKGROUND

1. Technical Field

The invention relates to a head-mounted display apparatus and a method for controlling the head-mounted display apparatus.

2. Related Art

Such a device has been known that displays an image overlapped on an external scene (for example, see JP-A-2014-56217). JP-A-2014-56217 discloses a wearable portable display apparatus configured to display, within a visual field on an external scene, characters in a document in an overlapped manner. In the configuration, display attributes, such as a font size and a character color, are changed for some of characters or words to be displayed for easy identification.

When an image is displayed in an overlapped manner on outside scenery, a user's visual field might be hindered. For this issue, when an image is displayed in an overlapped manner on outside scenery, some users demand that the image is displayed at a position of user intention, and that the position is easily changeable.

SUMMARY

An advantage of some aspects of the invention is to easily adjust a position for an image to be displayed.

For the issues described above, the invention includes a display unit to be worn on a user's head and configured to display an image overlapped on outside scenery visually recognizable through the image, an imaging unit, a detector configured to detect, under a condition that an image captured by the imaging unit includes an image of an object, a feature of the object identifiable from the image being captured, and a display controller configured to determine, based on the feature detected by the detector, a position for the image to be displayed, and to display the image at the position being determined.

According to the configuration, an image is displayed at a position determined based on a feature of an object. With this configuration, a position for an image to be displayed can be easily changed by changing a position of an object to be captured by the imaging unit. An image can be displayed as well at a position of user intention.

In the head-mounted display apparatus according to the invention, the detector detects, as the feature, at least one of a marker image applied onto the object, a figure indicative of a frame, and a color of the object. The display controller determines, based on the feature being detected, a position for an image to be displayed on the display unit.

According to the configuration, a position for an image to be displayed is determined based on at least one of a marker image applied onto an object, a figure indicative of a frame, and a color of the object. With this configuration, a feature of an object can be easily detected from an image captured by the imaging unit.

In the invention, the display controller controls, based on the feature detected by the detector, the display unit to display the image at a position overlapping on the object.

According to the configuration, an image can be displayed at a position overlapping on an object.

In the invention, the display controller determines, based on the feature being detected, a size for the image to be displayed, and causes the display unit to display the image with the size being determined.

According to the configuration, an image can be displayed with a size determined based on a feature of an object.

In the invention, the display controller adjusts a size for the image to be displayed on the display unit to a size conforming to a size of the object visually recognizable through the display unit.

According to the configuration, a size for an image to be displayed on the display unit can be adjusted to a size conforming to a size of an object visually recognizable through the display unit.

In the invention, the detector detects, as the feature, the marker image applied onto the object, and detects a region of the object, which has a color specified by code information extracted from the marker image being detected. The display controller determines, based on the region being detected, a position and a size for an image to be displayed, and displays the image overlapped on the region being detected.

According to the configuration, an image overlapped on a region having a color specified by code information can be displayed on an object.

In the invention, the detector detects, as the feature, the marker image applied onto the object, and detects the figure indicative of a frame having either of a color and a shape specified by code information extracted from the marker image being detected. The display controller determines, based on the figure being detected, a position and a size for an image to be displayed, and displays the image overlapped on the figure being detected.

According to the configuration, an image overlapped on a figure indicative of a frame having either of a color and a shape specified by code information can be displayed.

In the invention, the detector detects, as the feature, a region having a color set beforehand from the object. The display controller determines, based on the region being detected, a position and a size for an image to be displayed, and displays the image overlapped on the region being detected.

According to the configuration, an image overlapped on a region having a color set beforehand can be displayed on an object.

In the invention, the detector detects, as the feature, the figure indicative of a frame of the object. The display controller determines, based on the figure being detected, a position and a size for an image to be displayed, and displays the image overlapped on the figure being detected.

According to the configuration, an image overlapped on a figure indicative of a frame of an object can be displayed.

In the invention, the detector detects, as the marker image, a one-dimensional code or a two-dimensional code.

According to the configuration, a one-dimensional code or a two-dimensional code can be used as a marker image.

In the invention, the display controller determines, when a region having a color specified by the code information is detected across a plurality of sheets serving as the object, a position and a size for an image to be displayed to a position and a size for an image to be displayed across the plurality of sheets.

According to the configuration, an image can be displayed on a region expanding across a plurality of sheets.

In the invention, the display controller determines, when the figure having either of a color and a shape specified by code information is detected across the plurality of sheets serving as the object, a position and a size for an image to be displayed to a position and a size for an image to be displayed across the plurality of sheets.

According to the configuration, an image can be displayed on a region expanding across a plurality of sheets.

In the invention, a storage configured to store contents to be displayed is further included. The display controller selects, based on the feature of the object, from the contents stored in the storage, content to be displayed on the display unit, and causes the display unit to display the content being selected.

According to the configuration, content is selected based on a feature of an object. With this configuration, no operation of selecting content is required.

In the invention, an image processing unit configured to divide the contents stored in the storage into a plurality of blocks is further included. The display controller determines an order of display for the blocks being divided, and causes the display unit to display per block, following the order of display being determined, the contents being divided.

According to the configuration, a layout of content to be displayed on the display unit can be changed.

For the issues described above, a method, according to the invention, for controlling a head-mounted display apparatus including a display unit to be worn on a user's head and configured to display an image overlapped on outside scenery visually recognizable through the image and an imaging unit, includes detecting, under a condition that an image captured by the imaging unit includes an image of an object, a feature of the object optically identifiable from the image being captured, determining, based on the feature being detected, a position for an image to be displayed, and displaying the image at the position being determined.

According to the configuration, an image is displayed at a position determined based on a feature of an object. With this configuration, a position for an image to be displayed can be easily changed by changing a position of an object to be captured by the imaging unit. An image can be displayed as well at a position of user intention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
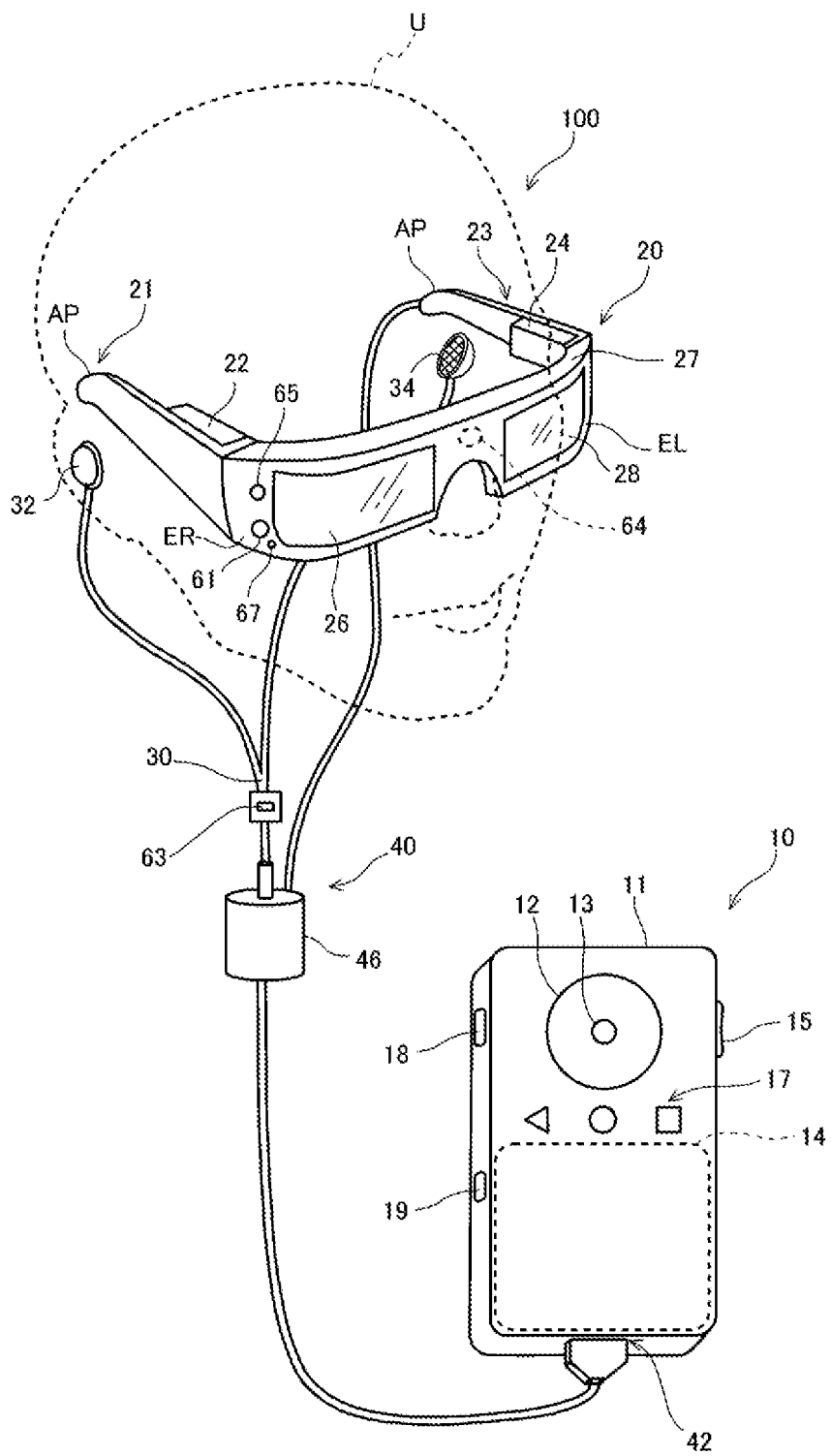
FIG. 1 is an explanatory view illustrating an external configuration of an HMD.

Exemplary Embodiments of the invention will now be described herein with reference to the accompanying drawings. FIG. 1 is a view illustrating an external configuration of a head-mounted display (HMD) 100.

The HMD 100 includes an image display unit 20 to be worn on a user U's head, and a controller 10 configured to control the image display unit 20. The image display unit 20 represents a functional unit configured to perform operations corresponding to operations of the "display unit" according to the invention. While being worn on the user U's head, the image display unit 20 allows the user U to visually recognize a virtual image. The controller 10 also functions as a control device used to operate the HMD 100 by the user U.

On a main body 11 having a box shape, the controller 10 includes various switches and an operation pad 14, for example, configured to accept operations by the user U. The image display unit 20 has an eyeglass shape in the exemplary embodiment, and includes a right holding part 21, a left holding part 23, a front frame 27, a right display unit 22, a left display unit 24, a right light-guiding plate 26, and a left light-guiding plate 28.

The right holding part 21 and the left holding part 23 extend rearward from ends of the front frame 27, respectively, to hold the image display unit 20 to the head of the user U. One of the ends of the front frame 27, which lies on the right side of the user U when s/he wears the image display unit 20, is referred to as an end ER, while the other one of the ends, which lies on the left side, is referred to as an end EL.

The right light-guiding plate 26 and the left light-guiding plate 28 are arranged in the front frame 27. While the image display unit 20 is worn, the right light-guiding plate 26 lies in front of a right eye of the user U, while the left light-guiding plate 28 lies in front of a left eye of the user U.

The right display unit 22 and the left display unit 24 are modules respectively formed into units with optical units and peripheral circuits and are each configured to emit imaging light. The right display unit 22 is attached to the right holding part 21, while the left display unit 24 is attached to the left holding part 23.

The right light-guiding plate 26 and the left light-guiding plate 28 are optical components made of light transmissive resin, for example. The right light-guiding plate 26 and the left light-guiding plate 28 are prisms, for example. The right light-guiding plate 26 guides imaging light output by the right display unit 22 to the right eye of the user U, while the left light-guiding plate 28 guides imaging light output by the left display unit 24 to the left eye of the user U. Therefore, the imaging light enters into both of the eyes of the user U. The user U can thus view an image.

The HMD 100 is a see-through type display apparatus. The imaging light guided by the right light-guiding plate 26 and outside light passed through the right light-guiding plate 26 enter into a right eye RE of the user U. Similarly, the imaging light guided by the left light-guiding plate 28 and outside light passed through the left light-guiding plate 28 enter into a left eye LE. As described above, the HMD 100 causes imaging light corresponding to an image processed internally and outside light to overlap with each other and enter into the eyes of the user U. The user U views, through the right light-guiding plate 26 and the left light-guiding plate 28, the image formed from the imaging light and overlapped onto outside scenery.

An illuminance sensor 65 is arranged on the front frame 27 of the image display unit 20. The illuminance sensor 65 is configured to receive outside light coming from in front of the user U wearing the image display unit 20.

A camera 61 is arranged on the front frame 27 of the image display unit 20. An imaging range and an imaging direction of the camera 61 will be described later. The camera 61 is provided at a position so that the camera 61 does not block the outside light passing through the right light-guiding plate 26 and the left light-guiding plate 28. In the example illustrated in FIG. 1, the camera 61 is arranged on the end ER of the front frame 27. However, the camera 61 may be arranged on the end EL or at the connection between the right light-guiding plate 26 and the left light-guiding plate 28. The camera 61 operates as an "imaging unit" according to the invention.

The camera 61 is a digital camera equipped with an imaging lens and an imaging element, such as a charge-coupled device (CCD) or a complementary metal oxide semiconductor (CMOS). The camera 61 according to the exemplary embodiment is a monocular camera. However, the camera 61 may be a stereo camera. The camera 61 captures an image of at least a part of outside scenery (real space) in a visual field direction of the user U wearing the HMD 100. An angle of view of the camera 61 faces in a front direction of the user U and overlaps with outside scenery viewed by the user U through the image display unit 20. A more preferable angle of view of the camera 61 covers a whole visual field, through the image display unit 20, of the user U. The camera 61 is configured to follow a control by a controller 150, capture an image, and output imaging data to the controller 150.

The front frame 27 is arranged with a light emitting diode (LED) indicator 67. The LED indicator 67 is arranged adjacent to the camera 61 on the end ER and configured to come on while the camera 61 is in operation to notify that capturing an image is in progress.

The front frame 27 is provided with a distance sensor 64. The distance sensor 64 is configured to detect a distance to an object to be measured lying in a measurement direction set beforehand. In the exemplary embodiment, the distance sensor 64 detects a distance to the object to be measured lying in front of the user U. The distance sensor 64 may be a light reflecting type distance sensor including a light source, such as an LED or a laser diode, configured to emit light and a light receiver configured to receive light reflected by the object to be measured, for example. The distance sensor 64 may be an ultrasonic wave type distance sensor including a sound source configured to generate ultrasonic waves, and a detector configured to receive the ultrasonic waves reflected by the object to be measured. The distance sensor 64 may be a laser range scanner (range-scanning sensor). In this case, a wider region including an area in front of the image display unit 20 can be scanned.

The controller 10 and the image display unit 20 are coupled via a coupling cable 40. The coupling cable 40 is detachably coupled to a connector 42 of the main body 11.

Figure 2:
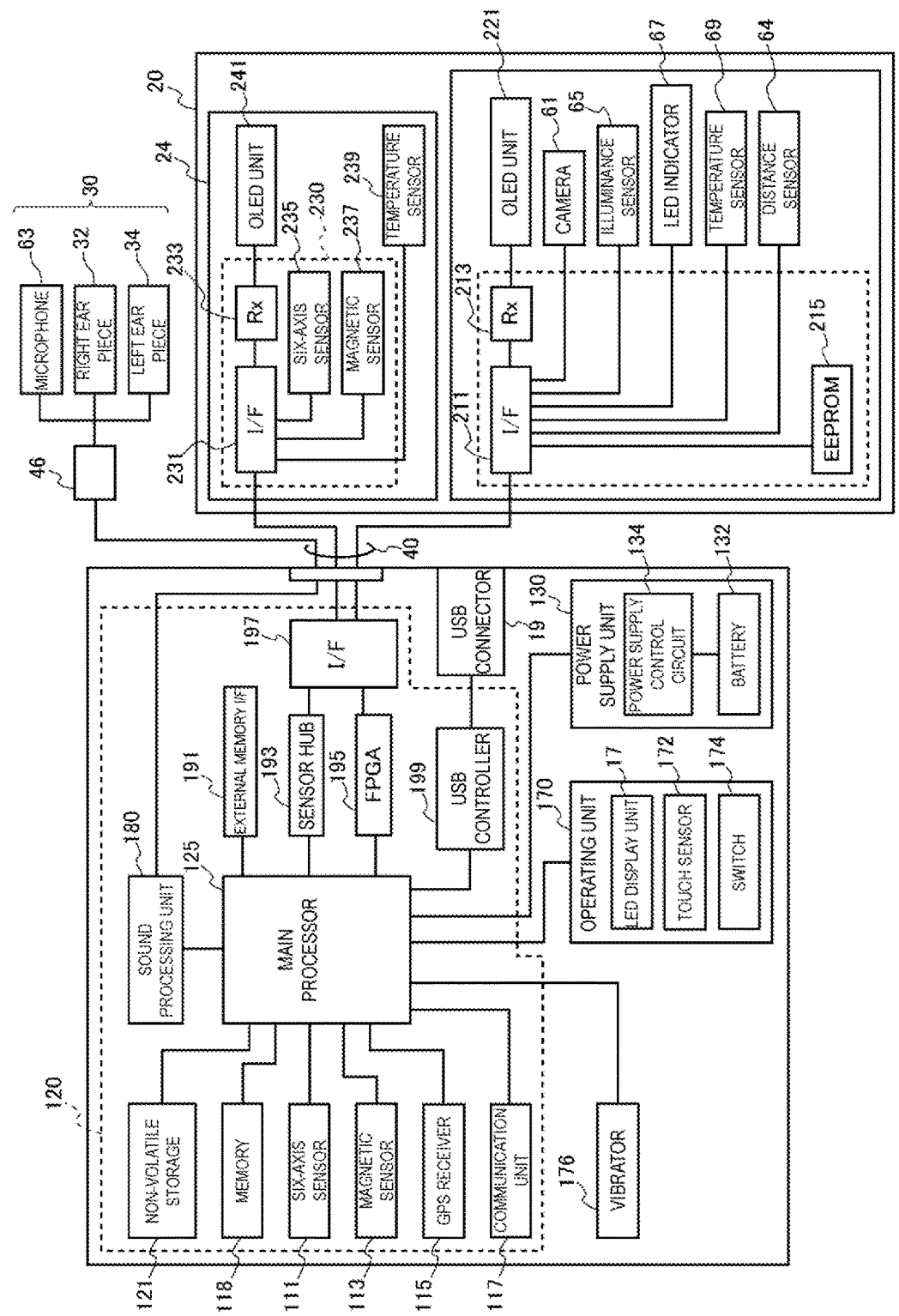
FIG. 2 is a block diagram illustrating a configuration of the HMD.

The coupling cable 40 includes an audio connector 46. The audio connector 46 is coupled to a headset 30 including a microphone 63 and a set of a right ear piece 32 and a left ear piece 34 configuring a stereo headphone. The right ear piece 32 is to be worn on a right ear of the user U, while the left ear piece 34 is to be worn on a left ear of the user U. The microphone 63 is configured to collect sound and output a sound signal to a sound processing unit 180 (FIG. 2). The microphone 63 may be a monaural microphone or a stereo microphone, for example, or may be a directional microphone or a non-directional microphone.

The controller 10 includes, as parts to be operated by the user U, a wheel operating unit 12, a central key 13, the operation pad 14, an up-down key 15, an LED display unit 17, and a power switch 18. The parts to be operated are arranged on a surface of the main body 11. The parts to be operated are operated with a hand or a finger of the user U, for example.

The operation pad 14 has an operation face configured to detect a touch operation and output an operation signal in accordance with an operation performed onto the operation face. A detection style for the operation face is not particularly limited, but may be an electrostatic style, a pressure detection style, or an optical style, for example. A touch (touch operation) onto the operation pad 14 is detected by a touch sensor (not illustrated), for example. The operation pad 14 outputs to the controller 150 a signal indicative of a position on the operation face when a touch is detected.

The main body 11 is mounted with the light emitting diode (LED) display unit 17. The LED display unit 17 includes a transmissive part (not illustrated) allowing light to pass through. As LEDs mounted immediately below the transmissive part come on, texts, symbols, and patterns, for example, formed on the transmissive part become viewable. A touch operation performed with a hand or a finger of the user U on the LED display unit 17 is detected by a touch sensor 172 (FIG. 2). Therefore, a combination of the LED display unit 17 and the touch sensor 172 functions as a software key.

The power switch 18 is used to turn on or off a power supply to the HMD 100. The main body 11 includes a universal serial bus (USB) connector 19 serving as an interface for coupling the controller 10 to an external device.

FIG. 2 is a block diagram illustrating a configuration of components configuring the HMD 100.

The controller 10 includes a main processor 125 configured to execute a program to control the HMD 100. The main processor 125 is coupled with a memory 118 and a non-volatile storage 121. The main processor 125 is coupled with an operating unit 170 serving as an input device. The main processor 125 is further coupled with sensors, such as a six-axis sensor 111, a magnetic sensor 113, and a global positioning system (GPS) 115.

The main processor 125 is coupled with a communication unit 117, a sound processing unit 180, an external memory interface 191, the USB connector 19, a sensor hub 193, and a field programmable gate array (FPGA) 195. The components function as interfaces to external devices.

The main processor 125 is mounted on a controller substrate 120 build into the controller 10. In the exemplary embodiment, the controller substrate 120 is mounted with the six-axis sensor 111, the magnetic sensor 113, the GPS 115, the communication unit 117, the memory 118, the non-volatile storage 121, and the sound processing unit 180, for example. The external memory interface 191, the USB connector 19, the sensor hub 193, the FPGA 195, and an interface 197 may be mounted on the controller substrate 120. The connector 42 and the USB connector 19 may further be mounted on the controller substrate 120.

The memory 118 configures a work area used to temporarily store a program to be executed by the main processor 125 and data to be processed by the main processor 125, for example. The non-volatile storage 121 includes a flash memory and an embedded multi-media card (eMMC). The non-volatile storage 121 is configured to store programs to be executed by the main processor 125 and data to be processed by the main processor 125.

The operating unit 170 includes the LED display unit 17, the touch sensor 172, and a switch 174. The touch sensor 172 is configured to detect a touch operation performed by the user U, identify a position of the operation, and output an operation signal to the main processor 125. The switch 174 is configured to output an operation signal to the main processor 125 in accordance with operations of the up-down key 15 and the power switch 18. The LED display unit 17 is configured to follow a control by the main processor 125 to turn on or off the LEDs, as well as to cause the LEDs to blink. The operating unit 170 is a switch substrate mounted with the LED display unit 17, the touch sensor 172, the switch 174, and circuits configured to control the respective components, for example, and is accommodated in the main body 11.

The six-axis sensor 111 is an example of a motion sensor (inertial sensor) configured to detect a motion of the controller 10. The six-axis sensor 111 includes a three-axis acceleration sensor and a three-axis gyro (angular velocity) sensor. The six-axis sensor 111 may be an inertial measurement unit (IMU) with the sensors, described above, formed into a module.

The magnetic sensor 113 is a three-axis geomagnetic sensor, for example.

The global positioning system (GPS) 115 includes a GPS antenna (not illustrated) and serves as a receiver configured to receive a radio signal transmitted from a GPS satellite. Based on a GPS signal, the GPS 115 detects or calculates coordinates of a present position of the controller 10.

The six-axis sensor 111, the magnetic sensor 113, and the GPS 115 output values to the main processor 125 in accordance with a sampling period specified beforehand. The six-axis sensor 111, the magnetic sensor 113, and the GPS 115 may each be configured to respond to a request from the main processor 125 to output a detected value to the main processor 125 at a timing specified by the main processor 125.

The communication unit 117 is a communication device configured to execute wireless communications with an external device. The communication unit 117 includes an antenna (not illustrated), a radio frequency (RF) circuit, a baseband circuit, and a communication control circuit, for example. The communication unit 117 may be a device integrated with an antenna, an RF circuit, a baseband circuit, and a communication control circuit, for example, or may be a communication module substrate mounted with various circuits.

The sound processing unit 180 is coupled to the audio connector 46 (FIG. 1), and is configured to accept and output sound signals, as well as to encode or decode sound signals. The sound processing unit 180 includes an analog/digital (A/D) converter configured to convert an analog sound signal into digital sound data and a digital/analog (D/A) converter configured to convert digital sound data into an analog sound signal.

The external memory interface 191 serves as an interface configured to be coupled with a portable memory device and includes an interface circuit and a memory card slot configured to be attached with a card-type recording medium to read data, for example.

The controller 10 is mounted with a vibrator 176. The vibrator 176 includes a motor (not illustrated) and an eccentric rotor (not illustrated), for example, and is controlled by the main processor 125 to generate vibration. For example, as the operating unit 170 is operated or the power supply to the HMD 100 is turned on or off, the vibrator 176 vibrates in a predetermined vibration pattern.

The interface (I/F) 197 couples the sensor hub 193 and the field programmable gate array (FPGA) 195 to the image display unit 20.

The sensor hub 193 is configured to acquire detected values of the sensors included in the image display unit 20 and output the detected values to the main processor 125. The FPGA 195 is configured to process data to be transmitted and received between the main processor 125 and components of the image display unit 20, as well as to execute transmissions via the interface 197.

With the coupling cable 40 and wires (not illustrated) inside the image display unit 20, the controller 10 is separately coupled with the right display unit 22 and the left display unit 24.

The right display unit 22 includes an organic light emitting diode (OLED) unit 221 configured to emit imaging light. The imaging light emitted by the OLED unit 221 is guided to the right light-guiding plate 26 by an optical system including a lens group, for example. The left display unit 24 includes an OLED unit 241 configured to emit imaging light. The imaging light emitted by the OLED unit 241 is guided to the left light-guiding plate 28 by an optical system including a lens group, for example.

The OLED units 221 and 241 respectively include drive circuits configured to drive OLED panels. The OLED panels are light emission type display panels each including light-emitting elements arranged in a matrix and configured to emit red (R) color light, green (G) color light, and blue (B) color light, respectively, by organic electro-luminescence. The OLED panels each include a plurality of pixels each including an R element, a G element, and a B element arranged in a matrix, and are each configured to form an image. The drive circuits are controlled by the controller 150 to select and power the light-emitting elements included in the OLED panels to cause the light-emitting elements included in the OLED panels to emit light. Therefore, imaging light of images formed by the OLED units 221 and 241 is guided by the right light-guiding plate 26 and the left light-guiding plate 28, and enters into the right eye RE and the left eye LE.

The right display unit 22 includes a display unit substrate 210. The display unit substrate 210 is mounted with an interface (I/F) 211 coupled to the interface 197, a receiver (Rx) 213 configured to receive data entered from the controller 10 via the interface 211, and an electrically erasable programmable read only memory (EEPROM) 215. The interface 211 couples the receiver 213, the EEPROM 215, a temperature sensor 69, the camera 61, the illuminance sensor 65, and the LED indicator 67 to the controller 10.

The electrically erasable programmable read only memory (EEPROM) 215 is configured to store data in a manner readable by the main processor 125. The EEPROM 215 stores data about a light-emitting property and a display property of the OLED units 221 and 241 included in the image display unit 20, and data about a property of a sensor included in the right display unit 22 or the left display unit 24, for example. Specifically, the EEPROM 215 stores parameters regarding Gamma correction performed by the OLED units 221 and 241 and data used to compensate for detected values of the temperature sensor 69 and a temperature sensor 239, for example. The data is generated when the HMD 100 is inspected before shipping from a factory, and written into the EEPROM 215. After shipped, the main processor 125 can use the data in the EEPROM 215 for performing processing.

The camera 61 follows a signal entered via the interface 211, captures an image, and outputs imaging data or a signal indicative of the result of imaging to the interface 211.

The illuminance sensor 65 is configured to output a detected value corresponding to an amount of received light (intensity of received light) to the interface 211. The LED indicator 67 follows a signal to be entered via the interface 211 to come on or go off.

The temperature sensor 69 is configured to detect a temperature and output a voltage value or a resistance value corresponding to the detected temperature, as a detected value, to the interface 211. The temperature sensor 69 is mounted on a rear face of the OLED panel included in the OLED unit 221 or a substrate mounted with the drive circuit configured to drive the OLED panel to detect a temperature of the OLED panel. When the OLED panel is mounted as an Si-OLED together with the drive circuit, for example, to form an integrated circuit on an integrated semiconductor chip, the temperature sensor 69 may be mounted on the semiconductor chip.

The receiver 213 is configured to receive data transmitted by the main processor 125 via the interface 211. Upon receiving image data via the interface 211, the receiver 213 outputs the received image data to the OLED unit 221.

The left display unit 24 includes a display unit substrate 230. The display unit substrate 230 is mounted with an interface (I/F) 231 coupled to the interface 197 and a receiver (Rx) 233 configured to receive data entered by the controller 10 via the interface 231. The display unit substrate 230 is further mounted with a six-axis sensor 235 and a magnetic sensor 237. The interface 231 couples the receiver 233, the six-axis sensor 235, the magnetic sensor 237, and the temperature sensor 239 to the controller 10.

The six-axis sensor 235 is an example of a motion sensor configured to detect a motion of the image display unit 20. The six-axis sensor 235 includes a three-axis acceleration sensor and a three-axis gyro sensor. The six-axis sensor 235 may be an inertial measurement unit (IMU) including the sensors, described above, formed into a module. The magnetic sensor 237 is a three-axis geomagnetic sensor, for example.

The temperature sensor 239 is configured to detect a temperature and output a voltage value or a resistance value corresponding to the detected temperature, as a detected value, to the interface 231. The temperature sensor 239 is mounted on a rear face of the OLED panel included in the OLED unit 241 or a substrate mounted with the drive circuit configured to drive the OLED panel to detect a temperature of the OLED panel. When the OLED panel is mounted as an Si-OLED together with the drive circuit, for example, to form an integrated circuit on an integrated semiconductor chip, the temperature sensor 239 may be mounted on the semiconductor chip.

The camera 61, the illuminance sensor 65, the temperature sensor 69, the six-axis sensor 235, the magnetic sensor 237, and the temperature sensor 239 are coupled to the sensor hub 193 of the controller 10.

The sensor hub 193 is configured to follow a control by the main processor 125 and set and initialize sampling periods of the sensors. Based on the sampling periods of the sensors, the sensor hub 193 supplies power to the sensors, transmits control data, and acquires detected values, for example. At a timing set beforehand, the sensor hub 193 outputs detected values of the sensors to the main processor 125. The sensor hub 193 may include a function of temporarily holding detected values of the sensors in conformity to a timing of output to the main processor 125. The sensor hub 193 may include a function of responding to a difference in signal format of output values of the sensors or in data format, converting data in a format into data in a unified data format, and outputting the converted data to the main processor 125.

The sensor hub 193 follows a control by the main processor 125, turns on or off power to the LED indicator 67, and allows the LED indicator 67 to come on or blink at a timing when the camera 61 starts or ends image capturing.

The controller 10 includes a power supply unit 130 and is configured to operate with power supplied from the power supply unit 130. The power supply unit 130 includes a rechargeable battery 132 and a power supply control circuit 134 configured to detect a remaining amount of the battery 132 and control charging to the battery 132.

The USB controller 199 is configured to function as a USB device controller, establish a communication with a USB host device coupled to the USB connector 19, and perform data communications. In addition to the function of the USB device controller, the USB controller 199 may include a function of a USB host controller.

Figure 3:
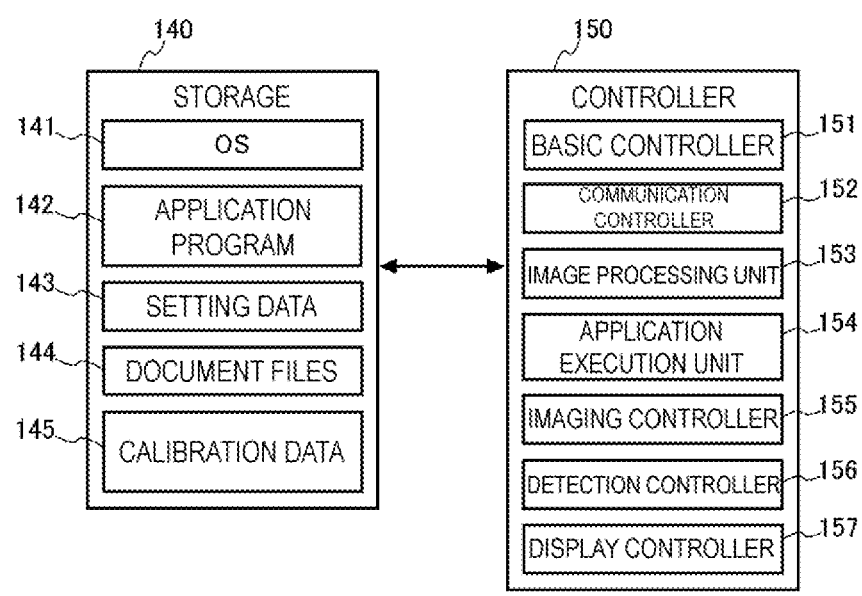
FIG. 3 is a functional block diagram of a control device.

FIG. 3 is a functional block diagram of a storage 140 and a controller 150 both configuring a control system of the controller 10 of the HMD 100. The storage 140 illustrated in FIG. 3 is a logical storage including the non-volatile storage 121 (FIG. 2) and may include the EEPROM 215. The controller 150 and various functional units included in the controller 150 are achieved when, as the main processor 125 executes a program, software and hardware work each other. The controller 150 and the functional units configuring the controller 150 are achieved with the main processor 125, the memory 118, and the non-volatile storage 121, for example.

The storage 140 is configured to store various programs to be executed by the main processor 125 and data to be processed with the programs. The storage 140 stores an operating system (OS) 141, an application program 142, setting data 143, document files 144, and calibration data 145.

The controller 150 executes the programs stored in the storage 140 and processes the data stored in the storage 140 to control the HMD 100.

The operating system 141 represents a basic control program for the HMD 100. The operating system 141 is executed by the main processor 125. As the power switch 18 is operated, and the power supply to the HMD 100 is turned on, the main processor 125 loads and executes the operating system 141. As the main processor 125 executes the operating system 141, various functions of the controller 150 are achieved. The controller 150 has various functions including a basic controller 151, a communication controller 152, an image processing unit 153, an application execution unit 154, an imaging controller 155, a detection controller 156, and a display controller 157. The detection controller 156 operates as the "detector" according to the invention. The display controller 157 operates as the "display controller" according to the invention.

The application program 142 is a program executed by the main processor 125 while the main processor 125 is executing the operating system 141. The application program 142 uses the various functions of the controller 150. In addition to the application program 142, the storage 140 may store a plurality of programs. For example, the application program 142 achieves functions, such as playing image contents, playing sound contents, gaming, capturing images with the camera, creating documents, web browsing, schedule administrating, telephony (including sound communications), image communication, and route navigation.

The setting data 143 includes various set values regarding operation of the HMD 100. The setting data 143 may include parameters, determinants, computing equations, look-up tables (LUTs), and the like used when the controller 150 controls the HMD 100.

The setting data 143 includes data to be used when the application program 142 is executed. Specifically, the setting data 143 includes data including execution conditions when various programs included in the application program 142 are executed. For example, the setting data 143 includes data indicative of a size of an image to be displayed when the application program 142 is executed, an orientation of a screen, a functional unit of the controller 150 to be used by the application program 142, and sensors of the HMD 100.

To introduce the application program 142, the HMD 100 uses a function of the controller 150 to execute an installation process. The installation process includes storing of the application program 142 into the storage 140 and setting of an execution condition for the application program 142, for example. Upon the setting data 143 corresponding to the application program 142 is generated or stored in the storage 140 during the installation process, the application execution unit 154 can start the application program 142.

The document files 144 represent document files created or edited with a computer, such as a WORD file, an EXCEL file, a Portable Document Format (PDF) file, and a Power Point (registered trademark) file. The document files 144 have file names as attribute information. In the exemplary embodiment, the document files 144 are described as an example of contents according to the invention. However, the contents are not limited to the document files 144, but may be image files conforming to Joint Photographic Experts Group (JPEG), Portable Network Graphics (PNG), and Graphics Interchange Format (GIF), for example.

Figure 4:
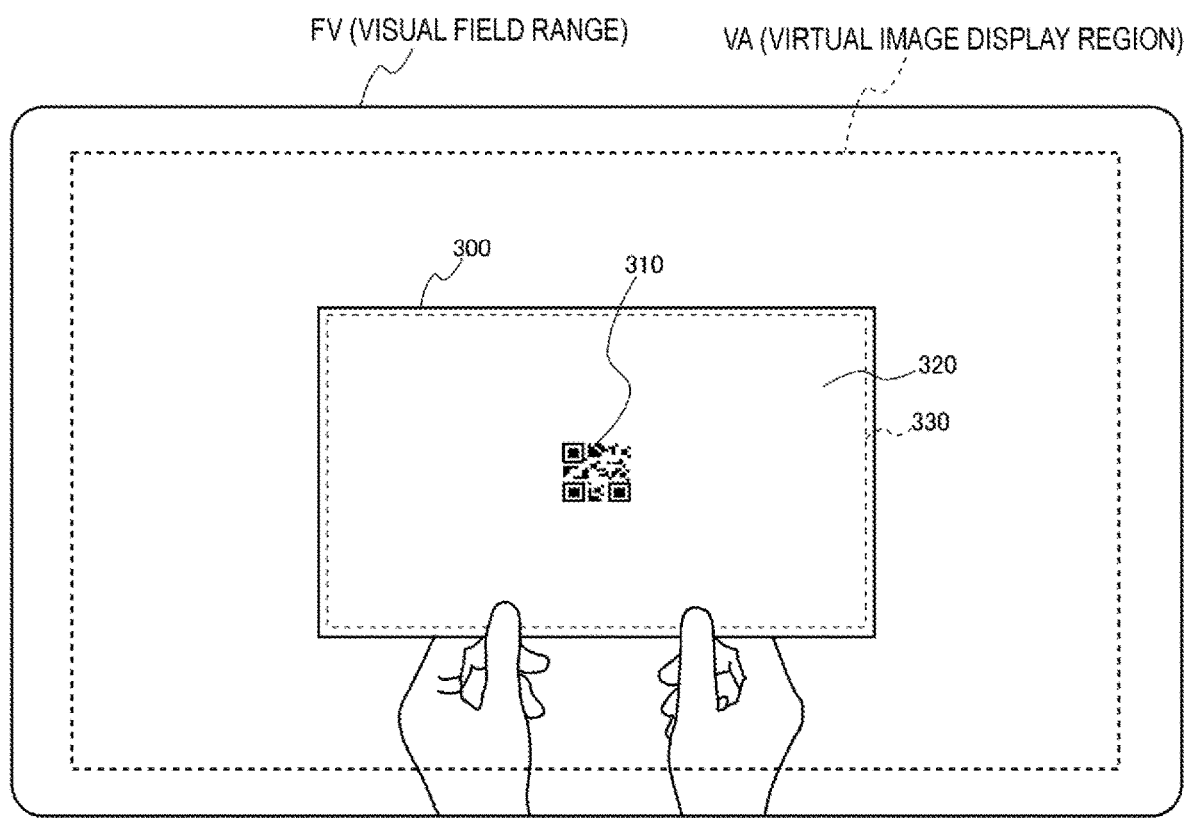
FIG. 4 is a view illustrating a virtual image display region.

The calibration data 145 represents data used to convert coordinates on imaging data into coordinates on a virtual image display region VA. Within the virtual image display region VA, the image display unit 20 can display an image (virtual image). FIG. 4 illustrates the virtual image display region VA. For example, when an actual object, such as a marker, is captured with the camera 61, and an image is displayed on the image display unit 20 at a position overlapping on the actual object being captured, the calibration data 145 representing data used to convert coordinates on imaging data into coordinates on the virtual image display region VA is required. For this purpose, calibration is performed beforehand to generate the calibration data 145 used to convert coordinates on imaging data into coordinates on the virtual image display region VA. The calibration data 145 being generated is stored in the storage 140 beforehand.

The basic controller 151 executes a basic function controlling the components of the HMD 100. Upon turning on the power supply to the HMD, the basic controller 151 executes a start process to initialize the components of the HMD 100 to allow the application execution unit 154 to execute the application program 142. To turn off power to the controller 10, the basic controller 151 executes a shutdown process to end the application execution unit 154, update various data stored in the storage 140, and stop the HMD 100. In the shut-down process, power to the image display unit 20 also stops, wholly shutting down the HMD 100.

The basic controller 151 includes a function of controlling power to be supplied from the power supply unit 130. With the shut-down process, the basic controller 151 separately turns off power supplied from the power supply unit 130 to each of the components of the HMD 100.

The communication controller 152 is configured to control the communication unit 117 to execute data communications with other devices.

The image processing unit 153 is configured to generate a signal to be transmitted to the right display unit 22 and the left display unit 24 based on image data or movie data to be displayed on the image display unit 20. Signals generated by the image processing unit 153 may be a vertical synchronizing signal, a horizontal synchronizing signal, a clock signal, an analog image signal, or the like. The image processing unit 153 may perform, as required, a resolution conversion process configured to convert the resolution of image data into a resolution appropriate for the right display unit 22 and the left display unit 24. The image processing unit 153 may execute an image adjustment process configured to adjust the brightness and saturation of image data and a 2D/3D conversion process configured to create 2D image data from 3D image data or generate 3D image data from 2D image data, for example. When one of the imaging processes is executed, the image processing unit 153 generates a signal for displaying an image based on the processed image data and transmits the signal to the image display unit 20.

The image processing unit 153 may be achieved when the main processor 125 executes the operating system 141 or may be separate hardware from the main processor 125. The hardware may be a digital signal processor (DSP), for example.

The application execution unit 154 corresponds to a function of executing the application program 142 while the main processor 125 is executing the operating system 141. The application execution unit 154 executes the application program 142 to achieve various functions of the application program 142. For example, when one of the document files 144 stored in the storage 140 is selected through an operation of the operating unit 170, the application program 142 configured to edit the one of the document files 144 is executed.

The imaging controller 155 controls and causes the camera 61 to capture an image, generates imaging data, and causes the storage 140 to temporarily store the imaging data. When the camera 61 is formed as a camera unit including a circuit configured to generate imaging data, the imaging controller 155 acquires the imaging data from the camera 61 and causes the memory 118 to temporarily store the imaging data.

Figure 5:
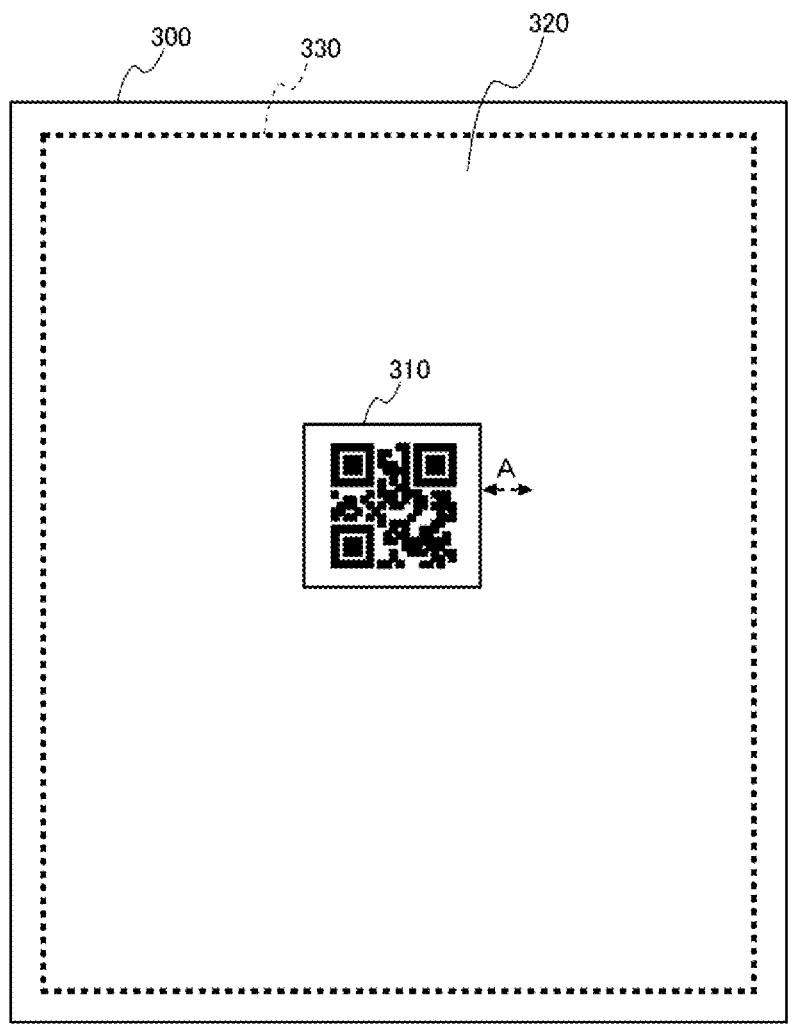
FIG. 5 is a view illustrating a sheet applied with a marker.

FIG. 5 is a view illustrating a sheet 300 applied with a marker 310.

The detection controller 156 acquires imaging data from the memory 118 and detects the marker 310 set beforehand from the imaging data being acquired. The detection controller 156 may start, under a condition that the imaging data includes an image of the sheet 300, detecting of the image of the marker 310. The marker 310 corresponds to the "marker image" according to the invention.

The user U manually moves the sheet 300 serving as an object onto the virtual image display region VA. FIG. 4 illustrates the sheet 300 when viewed by the user U. The sheet 300 is applied with the marker 310. The marker 310 may be a two-dimensional code, such as a QR code (trade name), or a one-dimensional code, such as a bar-code, for example. The marker 310 may otherwise be a figure set beforehand or a radio frequency identifier (RFID) tag, for example. The marker 310 may be printed on the sheet 300. An object printed with the marker 310 (for example, sticker) may be applied onto the sheet 300.

Upon detecting the image of the marker 310 from imaging data, the detection controller 156 extracts code information from the image of the marker 310 being detected. The code information includes a file name of one of the document files 144 and region specification information specifying the visual recognition region 320. The file name is to be displayed on the HMD 100. The visual recognition region 320 represents a region on the sheet 300. Within the visual recognition region 320, the image display unit 20 displays an image in an overlapped manner. The user U can visually recognize the image displayed in an overlapped manner within the visual recognition region 320 on the sheet 300.

The region specification information includes information specifying the region on the sheet 300, i.e., the visual recognition region 320. For example, when the visual recognition region 320 is specified by a frame, the region specification information includes one of information indicative of a shape, a color, and a line type of a figure indicative of the frame (hereinafter referred to as a frame body 330), information indicative of a shape and a line type of the frame body 330, and information indicative of a color and a line type of the frame body 330. When the visual recognition region 320 is specified by a color, the region specification information includes information specifying the color of the visual recognition region 320. When the visual recognition region 320 is specified by a color, the region specification information includes information indicative of a distance between the visual recognition region 320 and the marker 310, such as information indicative of a distance illustrated as a symbol A in FIG. 5. The information prevents, when a color of the marker 310 and a color set in the region specification information differ from each other, for example, the HMD 100 from erroneously detecting the color of the marker 310.

The detection controller 156 acquires region specification information from the code information being extracted. The detection controller 156 detects, based on the region specification information being acquired, the visual recognition region 320 from the imaging data. The imaging data in question is imaging data used to detect the image of the marker 310. For example, when the frame body 330 illustrated in FIG. 5 is to be detected, region specification information is set with black as the color of the frame body, rectangular as the shape, and dashed line as the line type. The detection controller 156 detects an image of the frame body 330 with the color, the shape, and the line type specified by the region specification information and sets, as the visual recognition region 320, a region on the sheet 300 including the frame body 330. The region being detected lies inside the frame body 330.

Figure 6:
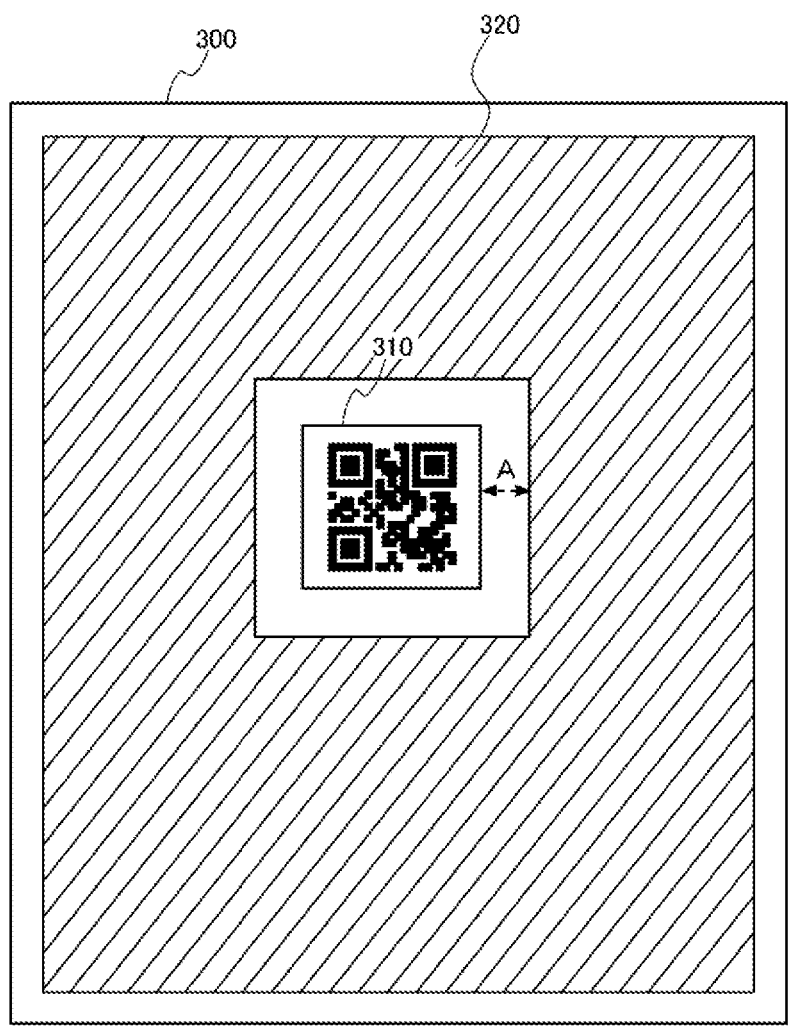
FIG. 6 is a view illustrating a sheet applied with a marker.

FIG. 6 is a view illustrating the sheet 300 applied with the marker 310.

When the visual recognition region 320 is specified by a color, the region specification information includes information specifying the color. The detection controller 156 detects a region having a color specified by the region specification information and sets the region being detected as the visual recognition region 320.

For example, here assumes that a region 320 indicated by oblique lines illustrated in FIG. 6 represents a region printed in "green". Here further assumes that a color specified by the region specification information is "green". In this case, the detection controller 156 detects a green region from imaging data and sets the region being detected as the visual recognition region 320. The detection controller 156 generates coordinates information indicative of a range of the visual recognition region 320 being set, and outputs the coordinates information to the display controller 157. Coordinates information to be generated by the detection controller 156 represents information indicative of coordinates set on imaging data of the camera 61. That is, coordinates information represents information indicative of a position on imaging data.

In the description with reference to FIGS. 5 and 6, the detection controller 156 first detects the image of the marker 310, extracts the code information, acquires the region specification information from the code information, and sets the visual recognition region 320.

When the detection controller 156 detects the frame body 330 having a shape, a color, and a line type set beforehand from imaging data, however, the sheet 300 may not be applied with the image of the marker 310. Similarly, when the detection controller 156 detects the color set beforehand of the sheet 300 from imaging data, the sheet 300 may not be applied with the image of the marker 310.

When the image of the marker 310 is not applied on the sheet 300, the HMD 100 displays one of the document files 144 set beforehand. In this case, the user U may operate the operating unit 170 to select the one of the document files 144.

The display controller 157 is configured to generate a control signal for controlling the right display unit 22 and the left display unit 24 and to control the generation and emission of the imaging light by each of the right display unit 22 and the left display unit 24. For example, the display controller 157 causes the OLED panels to display images to control timings when the OLED panels perform rendering, as well as to control brightness, for example. The display controller 157 controls the image display unit 20 to display an image on the virtual image display region VA.

The display controller 157 accepts coordinates information from the detection controller 156. The display controller 157 converts the coordinates information being accepted into coordinates of the virtual image display region VA with the calibration data 145. The display controller 157 identifies, based on the coordinates information being converted, a region of the virtual image display region VA corresponding to the visual recognition region 320. The region identified by the display controller 157 will be hereinafter referred to as a display region VR.

Upon identifying the display region VR, the display controller 157 causes the image processing unit 153 to change a size for an image to be displayed on the display region VR. The image to be displayed is derived from one of the document files 144. The one of the document files 144 corresponds to a file name acquired from code information.

The image processing unit 153 changes the size for the image to be displayed based on the one of the document files 144 to allow the image to be displayed based on the one of the document files 144 within the display region VR. More specifically, the image processing unit 153 increases or decreases the size for the image to be displayed based on the one of the document files 144 to allow the size for the image to be displayed based on the one of the document files 144 to be equal to or to correspond to the size of the display region VR. In this way, the size for the image to be displayed on the image display unit 20 is adjusted to the sheet 300 to be visually recognizable through the image display unit 20, specifically, to the visual recognition region 320 on the sheet 300.

Figure 7:
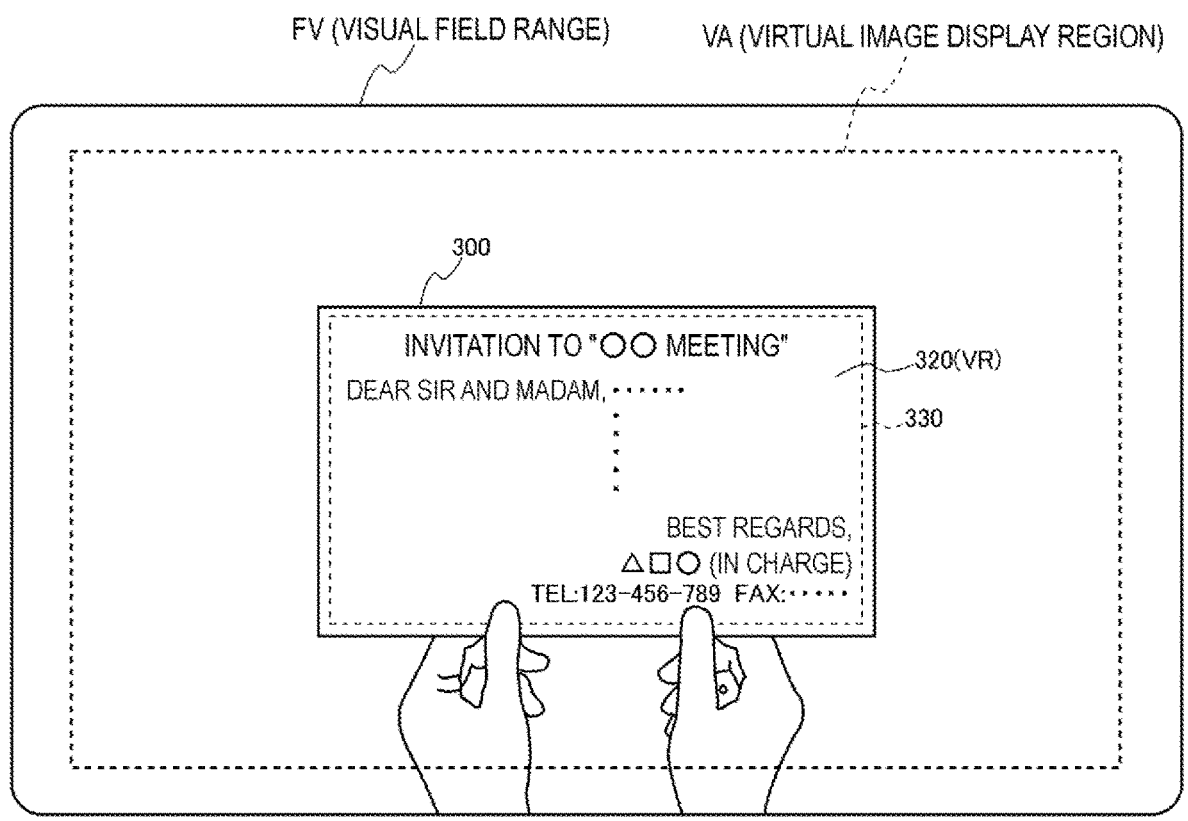
FIG. 7 is a view illustrating an image displayed on a visual recognition region.

Upon size-converted by the image processing unit 153, data based on the one of the document files 144 is output to the image display unit 20 and is displayed within the display region VR on the image display unit 20. In this way, the user U visually recognizes the image displayed based on the one of the document files 144 as if the image is displayed within the visual recognition region 320 on the sheet 300. FIG. 7 is a view illustrating an image displayed within the visual recognition region 320 on the sheet 300. An image to be displayed on the image display unit 20 is to be overlapped on the visual recognition region 320 or the frame body 330.

In the description with reference to FIGS. 4 to 6, the image is displayed on the sheet 300. However, an image can be displayed on a plurality of the sheets 300. For example, when an image is to be displayed in an overlapped manner on the two sheets 300, the image of the marker 310 is printed onto either of the sheets 300 to print the frame body 330 onto both of the sheets 300. At this time, the user U holds the sheets 300 to allow the first sheet 300 and the second sheet 300 to partially overlap with each other. At this time, the first sheet 300 is printed with a part of the frame body 330, while the second sheet 300 is printed with another part of the frame body 330. With the first sheet 300 and the second sheet 300, the frame body 330 having a single, closed rectangular is formed. In this case, the detection controller 156 recognizes the rectangular formed by the frame body 330 printed on both of the sheets 300 as the visual recognition region 320.

Similar to this, when the visual recognition region 320 is specified by a color, the color is printed onto both of the sheets 300. The color printed on both of the sheets 300 is thus recognized as the visual recognition region 320.

Figure 8:
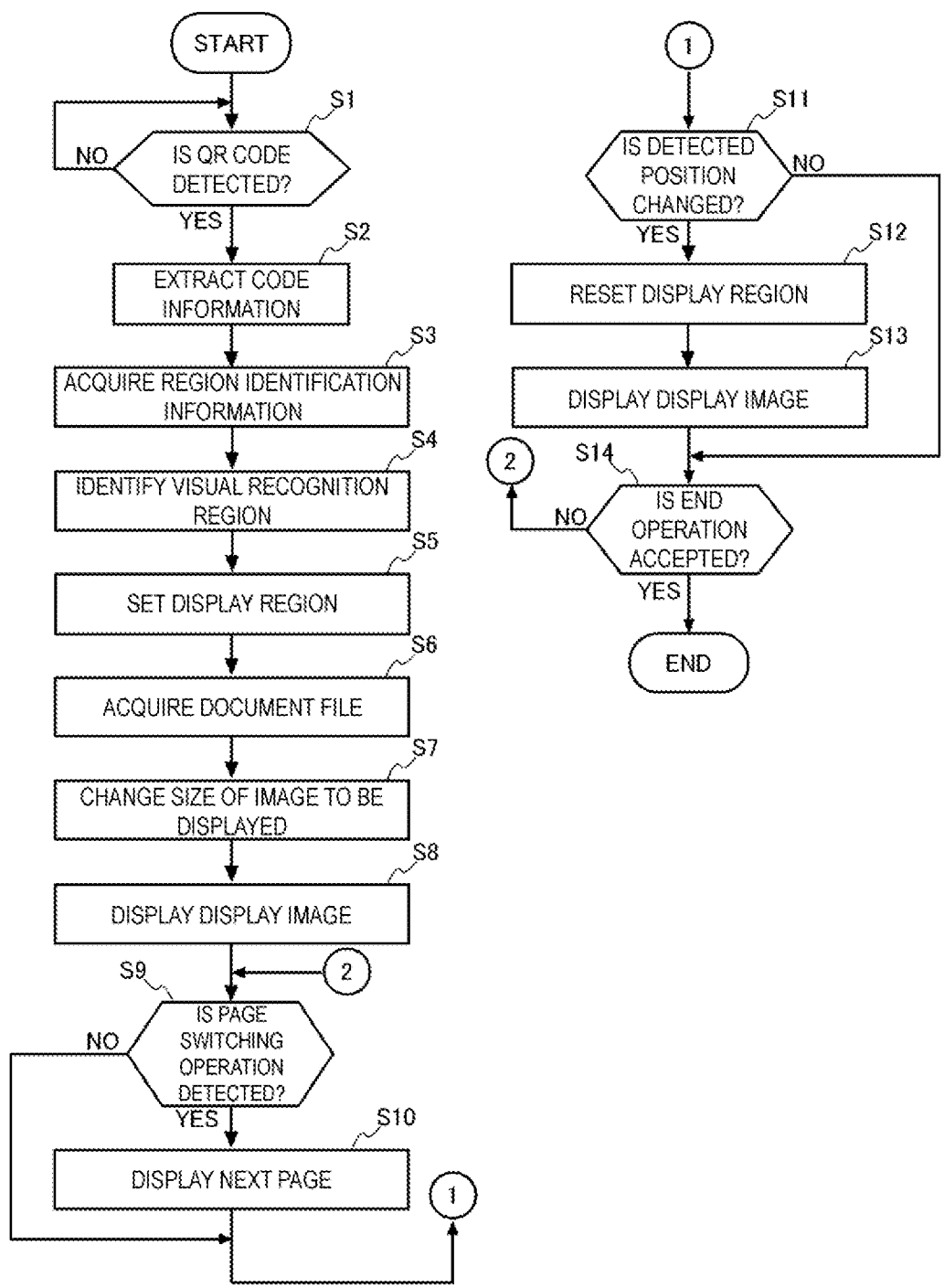
FIG. 8 is a flowchart illustrating an operation of the HMD.

FIG. 8 is a flowchart illustrating an operation of the HMD 100. The operation flow will be described with reference to an example of when a QR code is detected as the image of the marker 310.

The controller 150 first acquires imaging data of the camera 61 and detects a QR code from the imaging data being acquired. The camera 61 captures images per certain time. The imaging data of the camera 61 is temporarily stored in the memory 118. The controller 150 acquires the imaging data from the memory 118 and detects an image of a QR code from the imaging data being acquired.

When no image of a QR code is detected from the imaging data (step S1/NO), the controller 150 acquires next imaging data from the memory 118 and tries to detect again a QR code.

When an image of a QR code is detected from the imaging data (step S1/YES), the controller 150 extracts code information from the image being detected (step S2) and acquires region specification information from the code information being extracted (step S3).

Next, the controller 150 identifies the visual recognition region 320 based on the region specification information being acquired (step S4). The controller 150 detects, from the imaging data, the image of the frame body 330 having a shape, a color, and a line type specified by the region specification information, for example, to identify the visual recognition region 320 (step S4).

Next, the controller 150 uses the calibration data 145, converts coordinates of the visual recognition region 320 into coordinates of the virtual image display region VA, and identifies the display region VA (step S5). Next, the controller 150 acquires one of the document files 144 from the storage 140 based on a file name specified by the code information (step S6) and changes a size for an image to be displayed based on the acquired one of the document files 144 (step S7).

Next, the controller 150 causes the image display unit 20 to display, within the display region VA, the image based on the one of the document files 144 with the size being changed (step S8).

Next, the controller 150 determines whether a page switching operation is detected (step S9). The page switching operation may take place when the operating unit 170 is operated or when the user U gives a gesture, for example. For example, when the controller 150 detects, based on imaging data of the camera 61, that the user U has moved his or her hand leftward or downward, the controller 150 may determine the movement as the page switching operation. When the controller 150 detects, based on a detection value of the six-axis sensor 235, that the user U has moved his or her head leftward, for example, the controller 150 may determine the movement as the page switching operation.

Upon detecting the page switching operation (step S9/YES), the controller 150 causes the display region VA to display an image of a next page (step S10). When no page switching operation is detected (step S9/NO), the controller 150 determines whether the detected position of the visual recognition region 320 is changed (step S11). The controller 150 determines whether the position of the visual recognition region 320, which is detected from imaging data of the camera 61, is changed (step S11). When the controller 150 determines that the position of the visual recognition region 320 is not changed (step S11/NO), the controller 150 moves to a determination in step S14.

When the controller 150 determines that the position of the visual recognition region 320 is changed (step S11/YES), the controller 150 resets the display region VA based on the position of the visual recognition region 320 being detected (step S12). After the display region VA is reset, the controller 150 causes the display region VA being reset to display an image based on the one of the document files 144 (step S13).

Next, the controller 150 determines whether an operation of ending displaying of the one of the document files 144 is accepted. For example, the operation of ending displaying may be determined when no image of the sheet 300 is detected from imaging data of the camera 61. The operation of ending displaying may otherwise be accepted through an operation of the operating unit 170.

When no operation of ending displaying is accepted (step S14/NO), the controller 150 moves to a determination in step S9. Upon accepting the operation of ending displaying (step S14/YES), the controller 150 causes the flow to end.

Figure 9:
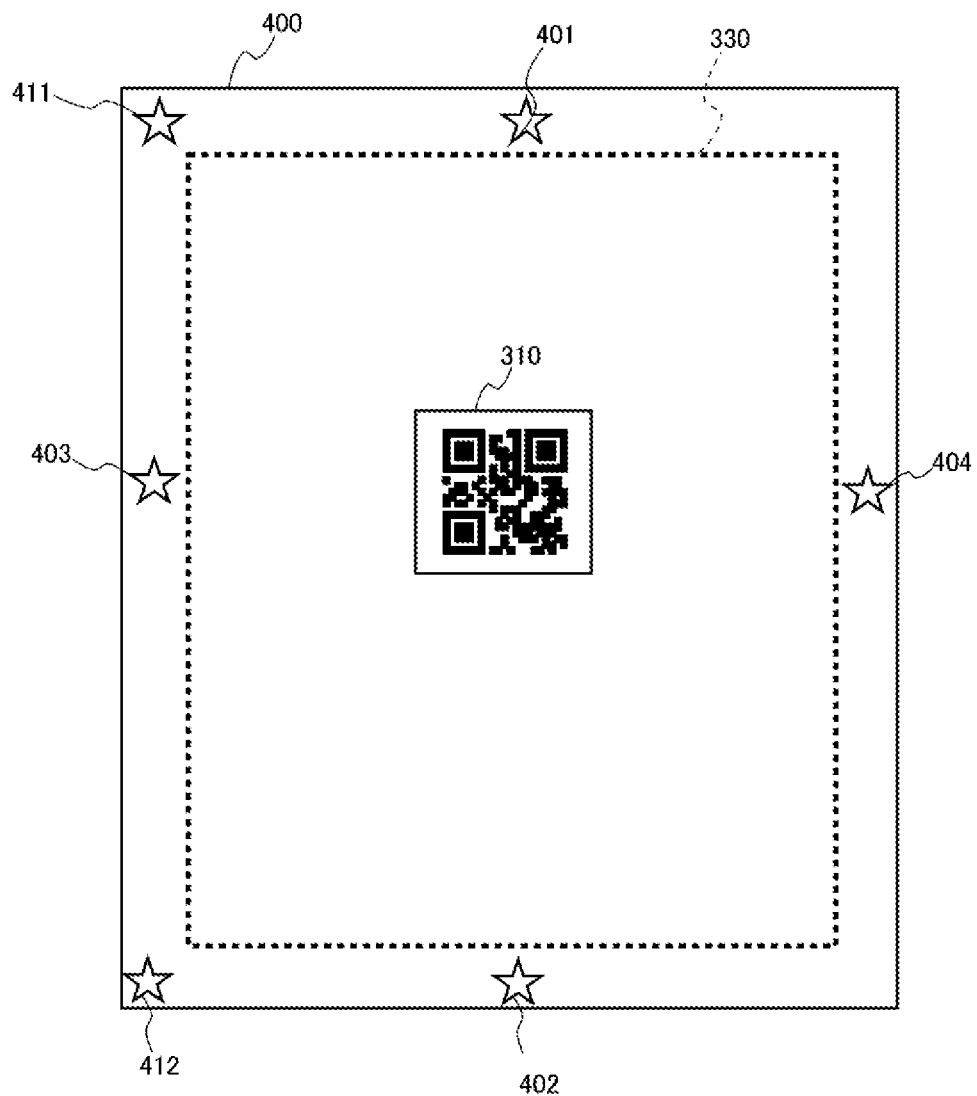
FIG. 9 is a view illustrating a sheet applied with a marker.

FIG. 9 is a view illustrating a sheet 400 applied with the marker 310.

FIG. 5 illustrates the sheet 300 displayed with the marker 310 and the frame body 330. The sheet 400 illustrated in FIG. 9 is displayed with, in addition to the marker 310, markers 401, 402, 403, 404, 411, and 412.

The marker 401 is associated with scrolling upward an image being displayed on the visual recognition region 320. For example, while an image is displayed on the display region VA, upon detecting, based on imaging data, that the user U has placed his or her finger on the marker 401, the controller 150 scrolls the image being displayed upward.

The marker 402 is associated with scrolling downward an image being displayed on the visual recognition region 320. For example, while an image is displayed on the display region VA, upon detecting, based on imaging data, that the user U has placed his or her finger on the marker 402, the controller 150 scrolls the image being displayed downward.

The marker 403 is associated with scrolling leftward an image being displayed on the visual recognition region 320. For example, while an image is displayed on the display region VA, upon detecting, based on imaging data, that the user U has placed his or her finger on the marker 403, the controller 150 scrolls the image being displayed leftward.

The marker 404 is associated with scrolling rightward an image being displayed on the visual recognition region 320. For example, while an image is displayed on the display region VA, upon detecting, based on imaging data, that the user U has placed his or her finger on the marker 404, the controller 150 scrolls the image being displayed rightward.

The marker 411 is associated with zooming in an image being displayed on the visual recognition region 320. For example, while an image is displayed on the display region VA, upon detecting, based on imaging data, that the user U has placed his or her finger on the marker 411, the controller 150 increases in size the image being displayed.

The marker 412 is associated with zooming out an image being displayed on the visual recognition region 320. For example, while an image is displayed on the display region VA, upon detecting, based on imaging data, that the user U has placed his or her finger on the marker 412, the controller 150 decreases in size the image being displayed.

When the controller 150 causes the display region VR to display an image, the controller 150 may change a layout of one of the document files 144 to allow an image being displayed based on the one of the document files 144 to be visually recognizable without making lateral scrolling.

In this case, the detection controller 156 outputs, to the image processing unit 153, the one of the document files 144, a file name of which is acquired from code information. The image processing unit 153 accepts the one of the document files 144 from the display controller 157 and analyzes the one of the document files 144 to divide pages constituting the one of the document files 144 into a character string part including character strings and a figure and table part. For the character string part, the image processing unit 153 sets a plurality of adjacent character strings within a certain distance as a block (hereinafter referred to as a character string block). The image processing unit 153 further sets a figure or a display as a block (hereinafter referred to as a figure and table block).

The image processing unit 153 sets an order of display for character string blocks and figure and table blocks being set. Specifically, the more leftward and upward in a page, the higher the blocks to be set in the order of display. The more rightward and downward, the lower the blocks to be set in the order of display.

Upon setting the order of display for the character string blocks and the figure and table blocks, the image processing unit 153 changes a layout of the blocks based on a size of the display region VR and sizes of the blocks.

Upon the layout has been changed, the image processing unit 153 outputs the character string blocks and the figure and table blocks to the image display unit 20 and causes the image display unit 20 to display the blocks within the display region VR.

As described above, the HMD 100 according to the exemplary embodiment includes the image display unit 20, the camera 61, the detection controller 156, and the display controller 157.

The image display unit 20 is worn on the user U's head and is configured to display an image overlapped on outside scenery visually recognizable through the image.

The detection controller 156 detects, under a condition that an image of the sheet 300 is included in imaging data of the camera 61, a feature of the sheet 300 identifiable from imaging data.

The display controller 157 determines, based on the feature detected by the detection controller 156, a position for the image to be displayed, and displays the image at the position being determined.

According to the configuration, an image can be displayed at a position determined based on a feature of the sheet 300. With this configuration, by changing a position of the sheet 300 to be captured by the camera 61, a position for an image to be displayed can be changed. An image can be displayed at a position of user U intention. When the sheet 300 is used as an object, highly visually recognizable characters can be displayed in an overlapped manner on the sheet 300.

The detection controller 156 detects, as a feature, at least one of the marker 310 applied onto the sheet 300, the frame body 330, and a color of the sheet 300. The display controller 157 determines a position for an image to be displayed on the image display unit 20 based on the feature being detected.

The display controller 157 displays the image at the position determined by the detection controller 156.

A position for an image to be displayed is thus determined based on at least one of the marker 310, a shape of the frame body 330, and a color of the sheet 300. With this configuration, a feature of the sheet 300 can be easily detected based on imaging data of the camera 61.

The display controller 157 controls the image display unit 20 based on a feature detected by the detection controller 156 to allow an image to be displayed at a position overlapping on the sheet 300.

According to the configuration, an image can be displayed at a position overlapping on the sheet 300.

The display controller 157 determines, based on a feature being detected, a size for an image to be displayed and causes the image display unit 20 to display the image with the size being determined.

According to the configuration, an image can be displayed with a size determined based on a feature of the sheet 300.

The display controller 157 adjusts a size for an image to be displayed on the image display unit 20 to a size conforming to a size of an object visually recognizable through the image display unit 20.

According to the configuration, a size for an image to be displayed on the image display unit 20 can be adjusted to a size conforming to a size of an object visually recognizable through the image display unit 20.

The detection controller 156 detects, as a feature, the marker 310 applied onto the sheet 300 and detects, as the visual recognition region 320, a region of the sheet 300. The region has a color specified by code information extracted from marker 310 being detected. The display controller 157 determines, based on the visual recognition region 320 being detected, a position and a size for an image to be displayed and causes the image to be displayed in an overlapped manner on the region being detected.

According to the configuration, an image overlapped on the visual recognition region 320 having a color specified by code information can be displayed on the sheet 300.

The detection controller 156 detects, as a feature, the marker image 310 applied onto the sheet 300 and detects the frame body 330 having either of a color and a shape specified by code information extracted from the marker 310 being detected. The display controller 157 determines, based on the frame body 330 being detected, a position and a size for an image to be displayed and causes the image to be displayed in an overlapped manner on the frame body 330 being detected.

According to the configuration, an image overlapped on the frame body 330 having either of a color and a shape specified by code information can be displayed.

The detection controller 156 detects, as the visual recognition region 320, a region having a color set beforehand, as a feature, on the sheet 300. The display controller 157 determines, based on the visual recognition region 320 being detected, a position and a size for an image to be displayed and causes the image to be displayed in an overlapped manner on the region being detected.

According to the configuration, an image overlapped on the visual recognition region 320 having a color set beforehand can be displayed on the sheet 300.

The detection controller 156 detects, as a feature, the frame body 330 of the sheet 300. The display controller 157 determines, based on the frame body 330 being detected, a position and a size for an image to be displayed and causes the image to be displayed in an overlapped manner on the frame body 330 being detected.

According to the configuration, an image overlapped on a figure indicative of a frame of an object can be displayed.

The detection controller 156 detects, as the marker 310, a one-dimensional code or a two-dimensional code.

A one-dimensional code or a two-dimensional code can be used as the marker 310.

The display controller 157 determines, when the visual recognition region 320 having a color specified by code information is detected across a plurality of sheets serving as an object, a position and a size for an image to be displayed to a position and a size for an image to be displayed across the plurality of sheets.

The image can thus be displayed on the visual recognition region 320 expanding across the plurality of sheets.

The display controller 157 determines, when the frame body 330 having either of a color and a shape specified by code information is detected across a plurality of the sheets 300, a position and a size for an image to be displayed to a position and a size for an image to be displayed across the plurality of sheets 300.

The image can thus be displayed on the visual recognition region 320 expanding across the plurality of sheets 300.

The HMD 100 includes the storage 140 configured to store the document files 144. The detection controller 156 selects, based on a feature of the sheet 300, content to be displayed on the image display unit 20 from the document files 144 stored in the storage 140.

The display controller 157 causes the image display unit 20 to display the content selected by the detection controller 156.

According to the configuration, one of the document files 144 can be selected based on a feature of an object. With this configuration, no operation of selecting content is required.

The HMD 100 includes the image processing unit 153 configured to divide the document files 144 stored in the storage 140 into a plurality of blocks.

The display controller 157 determines an order of display for the blocks being divided, and causes the image display unit 20 to display per block, following the order of display being determined, the contents being divided.

A layout of one of the document files 144 to be displayed on the image display unit 20 can thus be changed.

The invention is not limited to the exemplary embodiment configured as described above, but can be implemented in various aspects without departing from the gist of the invention.

For example, instead of the image display unit 20, an image display unit in another style may be adopted, such as a cap style image display unit. Such an image display unit in another style may at least include a display unit configured to display an image corresponding to the left eye of the user U and a display unit configured to display an image corresponding to the right eye of the user U. The invention may be configured to achieve a head-mounted display to be mounted on a vehicle, such as a car and an airplane, for example. For example, a head-mounted display apparatus built into a body protector, such as a helmet, may be used. In this case, a positioning portion may be at a position of the body of the user U and an attaching portion may be attached to the position of the body of the user U.

The controller 10 and the image display unit 20 integrated with each other may be worn on a user U's head. The controller 10 may be a portable electronic device, such as a laptop computer, a tablet computer, a gaming device, a cellular phone, a smart phone, or a portable media player, or another special device, for example.

In the exemplary embodiments described above, the image display unit 20 and the controller 10 separated from each other are coupled via the coupling cable 40. However, the controller 10 and the image display unit 20 may be coupled via a wireless communication line.

As an optical system configured to guide imaging light to eyes of the user U, the right light-guiding plate 26 and the left light-guiding plate 28 may respectively use half mirrors, diffraction gratings, or prisms, for example. The image display unit 20 may be a holography display unit.

Such a configuration may be adopted that at least some of the functional blocks illustrated in the block diagram are achieved with hardware or achieved with hardware and software. The invention is not limited to such a configuration where separate hardware resources are arranged as illustrated in the drawings. Programs to be executed by the controller 150 may be stored in the non-volatile storage 121 or another storage (not illustrated) in the controller 10. Such a configuration may be adopted that a program to be executed is stored in an external device and acquired via the USB connector 19, the communication unit 117, and the external memory interface 191, for example. Components identical to the components formed on the controller 10 may be formed on a duplicated manner on the image display unit 20. For example, a processor similar to the main processor 125 may be disposed on the image display unit 20. The main processor 125 included in the controller 10 and a processor in the image display unit 20 may be respectively configured to execute functions different from each other.

To achieve the method for controlling the head-mounted display apparatus, according to the invention, with a computer including a display apparatus, the invention may be such an aspect that includes a program to be executed by the computer to achieve the control method described above and a recording medium recorded with the program to be readable by the computer or a transmission medium configured to transmit the program. The recording medium described above may be a magnetic recording medium, an optical recording medium, or a semiconductor memory device. Specifically, the recording medium described above may be a portable or fixed recording medium, such as a flexible disk, a hard disk drive (HDD), a compact disk read only memory (CD-ROM), a digital versatile disk (DVD), a Blu-ray (trade name) disc, a magneto-optical disk, a flash memory, or a card-type recording medium. The recording medium described above may be a non-volatile storage, such as a random access memory (RAM), a read only memory (ROM), and a hard disk drive (HDD) all representing internal storages included in an image display apparatus.

The entire disclosure of Japanese Patent Application No.: 2018-009518, filed Jan. 24, 2018 is expressly incorporated by reference herein.

What is claimed is:

1. A head-mounted display apparatus comprising:
a light-guiding plate to be worn on a user's head and configured to display a first virtual image overlapped on real outside scenery visually recognizable through the first virtual image;
a camera; and
a processor programmed to
detect, under a condition that a second image captured by the camera includes a real object, a real marker of the real object identifiable from the second image being captured, and
determine, based on the real marker detected, a position for the first virtual image to be displayed, and to display the first virtual image at the position being determined, wherein
the position at which the first virtual image is displayed overlaps a position of the real marker detected from the second image,
the processor detects a real frame from the second image,
the real frame is detected using frame information included in the real marker, the frame information including a color of the real frame, a shape of the real frame, and a line type of the real frame, and
the real frame defines an area in which the first virtual image is entirely displayed.

2. The head-mounted display apparatus according to claim 1, wherein the processor determines, based on the real marker being detected, a size for the first virtual image to be displayed, and causes the light-guiding plate to display the first virtual image with the size being determined.

3. The head-mounted display apparatus according to claim 2, wherein the processor adjusts the size of the first virtual image to be displayed on the light-guiding plate to a size of the real object visually recognized through the light-guiding plate.

4. The head-mounted display apparatus according to claim 2, wherein the processor determines, when the real frame having the color included in the frame information is detected across a plurality of sheets serving as the real object, the position and the size for the first virtual image to be displayed to a position and a size across the plurality of sheets.

5. The head-mounted display apparatus according to claim 2, wherein the processor determines, when the real frame having the shape included in the code frame information is detected across a plurality of sheets serving as the real object, the position and the size for the first virtual image to be displayed to a position and a size across the plurality of sheets.

6. The head-mounted display apparatus according to claim 1, wherein the processor detects, as the real marker, a one-dimensional code or a two-dimensional code.

7. The head-mounted display apparatus according to claim 1, further comprising
a memory configured to store contents to be displayed, wherein
the processor
selects, based on the real marker of the real object, from the contents stored in the memory, content to be displayed on the light-guiding plate, and
causes the light-guiding plate to display the content being selected.

8. The head-mounted display apparatus according to claim 7, wherein
the processor
divides the contents stored in the memory into a plurality of blocks,
determines an order of display for the blocks being divided, and
causes the light-guiding plate to display per block, following the order of display being determined, the contents being divided.

9. A method for controlling a head-mounted display apparatus including a light-guiding plate to be worn on a user's head and configured to display a first virtual image overlapped on real outside scenery visually recognizable through the first virtual image and a camera, the method comprising:
detecting, under a condition that a second image captured by the camera includes a real object, a real marker of the real object optically identifiable from the second image being captured;
determining, based on the real marker being detected, a position for the first virtual image to be displayed; and
displaying the first virtual image at the position being determined, wherein
the position at which the first virtual image is displayed overlaps a position of the real marker detected from the second image,
a real frame is detected from the second image,
the real frame is detected using frame information included in the real marker, the frame information including a color of the real frame, a shape of the real frame, and a line type of the real frame, and
the real frame defines an area in which the first virtual image is entirely displayed.

* * * * *